US006354482B1

(12) United States Patent
Diebold et al.

(10) Patent No.: US 6,354,482 B1
(45) Date of Patent: Mar. 12, 2002

(54) FRICTION WELDER

(75) Inventors: Thomas P. Diebold, Tucson, AZ (US); Antonio B. Caruolo, Vernon, CT (US); Francis J. Yopak, Southwick, MA (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/187,628

(22) Filed: Nov. 6, 1998

(51) Int. Cl.[7] .............................................. B23K 20/12

(52) U.S. Cl. ................................ 228/112.1; 156/580.2; 228/2.1; 228/44.3

(58) Field of Search ............................ 228/112.1, 113, 228/114.5, 212, 213, 262.1, 1.1, 2.1, 2.3, 47.1, 28, 48, 49.1, 49.2; 156/580, 580.1, 580.2; 269/37, 41

(56) References Cited

U.S. PATENT DOCUMENTS

| | | | |
|---|---|---|---|
| 3,567,100 A | 3/1971 | Farmer et al. | 228/2 |
| 3,698,617 A | 10/1972 | Fukaya et al. | 228/2 |
| 3,711,009 A | 1/1973 | Kuzuya et al. | 228/2 |
| 3,720,993 A | 3/1973 | Farmer et al. | 29/470.3 |
| 3,771,706 A | 11/1973 | Martens | 228/2 |
| 3,777,967 A | 12/1973 | Searle et al. | 228/2 |
| 3,840,168 A | 10/1974 | Searle et al. | 228/2 |
| 4,086,122 A | 4/1978 | Bouyoucos et al. | 156/556 |
| 4,377,428 A | 3/1983 | Toth | 156/73.5 |
| 4,811,887 A | 3/1989 | King et al. | 228/2 |
| 4,844,320 A | 7/1989 | Stokes et al. | 228/102 |
| 4,858,815 A | 8/1989 | Roberts et al. | 228/2 |
| 4,864,706 A | 9/1989 | Jenkel | 29/156.8 R |
| 4,873,751 A | 10/1989 | Walker et al. | 29/156.8 B |
| 4,884,736 A | 12/1989 | Goddard | 228/2 |
| 4,905,883 A | 3/1990 | Searle | 228/2 |
| 4,995,544 A | 2/1991 | Searle | 228/2 |
| 5,035,411 A | 7/1991 | Daines et al. | 269/231 |
| 5,100,044 A | 3/1992 | Searle | 228/112 |

(List continued on next page.)

FOREIGN PATENT DOCUMENTS

| | | |
|---|---|---|
| GB | 1293531 | 10/1972 |
| GB | 1293532 | 10/1972 |
| GB | 1385471 | 2/1975 |

OTHER PUBLICATIONS

"Metallurgia", Copyright 1990 FMJ International Publications Ltd., May, 1990, vol. 57, No. 5, p. 236, ISSN: 0141–8602, 3 pages.

"Linear friction welding joins noncircular sections", Advanced Materials & Processes, 2/91, p. 47.

"Process Data Acquisition in Vibration Welding of Termoplastics", Helmut Potente and Harald Kaiser, Polymer Engineering and Science, Mid–Dec., 1989, vol. 29, No. 23, pp. 1661–1666.

(List continued on next page.)

Primary Examiner—Tom Dunn
Assistant Examiner—Jonathan Johnson
(74) Attorney, Agent, or Firm—John Swiatocha

(57) ABSTRACT

An apparatus for friction welding a first element to a second element includes a forge assembly having a table defining a platform, a crank, a forge link and a reaction link disposed oppositely of the forge link relative to the platform. Various construction details are disclosed that provide a friction welder that minimizes bending in the forge and motion planes and enhances repeatability of the welds performed. In a specific embodiment, the friction welder may be used in a method to form integrally bladed rotors and further includes a reciprocal motion assembly adapted to generate motion between the elements being welded, a gripper and an base tool. The reciprocal motion assembly includes a servo hydraulic actuator having a hydraulic column frequency greater than the frequency of reciprocation. The gripper is a device for use with bonding an airfoil to the rotor. The base tool is a device for mounting and positioning the rotor for the bonding operations.

7 Claims, 6 Drawing Sheets

U.S. PATENT DOCUMENTS

| | | | |
|---|---|---|---|
| 5,109,606 A | 5/1992 | DeMichael et al. | 29/889.1 |
| 5,113,583 A | 5/1992 | Jenkel et al. | 29/889.21 |
| 5,148,957 A | 9/1992 | Searle | 228/2 |
| 5,160,393 A | 11/1992 | Snyder | 156/73.5 |
| 5,188,275 A | 2/1993 | Daines | 228/2 |
| 5,197,190 A | 3/1993 | Coolidge | 29/889.1 |
| 5,261,592 A * | 11/1993 | Felix et al. | 228/114.5 |
| 5,339,504 A | 8/1994 | Thumm et al. | 29/48.5 A |
| 5,468,334 A | 11/1995 | Searle | 156/580 |
| 5,486,262 A | 1/1996 | Searle | 156/580 |
| 5,518,562 A | 5/1996 | Searle et al. | 156/73.8 |
| 5,678,749 A | 10/1997 | Pratt et al. | 228/2.1 |
| 5,813,593 A * | 9/1998 | Glasket, Jr. | 228/112.1 |
| 5,849,146 A * | 12/1998 | Searle et al. | 156/580 |

OTHER PUBLICATIONS

"Joining Titanium Aluminides", by Philip Threadgill, Aircraft Engineering, Apr. 1991, pp. 12–13.

Structure, Properties, and Fracture of Linear Friction Welded Al–Fe–V–Si Alloy 8009, H. H. Koo and W. A. Baeslack, III, Department of Welding Engineering, The Ohio State University, Columbus, OH 43210, Materials Characterization 28:157–164 (1992).

"Vibration Welding", A Materials Technology View of a Mass–production Method, A. K, Schlarb and G. W. Ehrenstein, Kassel, Kunststoffe German Plastics 78, 1988, pp. 30–32.

Developments in Mechanics, vol. 14(a), Proceedings of the $20^{th}$ Midwestern Mechanics Conference, Sponsored by School of Mechanical Engineering, Purdue University, Aug. 31–Sep. 2, 1987, pp. 394–399.

"Vibration Welding: Fast, Quiet, Efficient . . . ", Assembly Engineering, Richard D. Holtz, Managing Editor, Jun., 1979, pp. 36–39.

"An Analysis of Vibration Welding", H. Potente, P. Michel and B. Ruthmann, Paderborn, Kunststoffe German Plastics 77 (1987), pp. 31–34.

"Welding developments", Automotive Engineer, Oct./Nov., 1990, pp. 32–35.

"A Model for the Nonlinear Heat Transfer Process in the Early Stages of Vibration Friction Welding",by M. H. Attia and M. O. M. Osman, PED– vol. 54/TRIB–vol. 2, Tribological Aspects in Manufacturing, ASME, 1991, 7 xerox pages.

* cited by examiner

FRICTION WELDER

CROSS-REFERENCE

The present application is related to the subject matter disclosed in U.S. patent application Ser. No. 09/187,511 filed Nov. 6, 1998 now U.S. Pat. No. 6,244,495 filed on the same date as this application, entitled "Gripper", as well as the subject matter disclosed in the U.S. patent application Ser. No. 09/187,073 filed Nov. 6, 1998, now abandoned also filed on the same date as this application, entitled "Indexing Turret." Both of these applications are incorporated herein by reference in their entirety.

TECHNICAL FIELD

This invention relates to friction welders, and more particularly to servo hydraulically driven friction welders.

Although the invention was developed in the field of aircraft engines it has application to other fields where friction welding may be used to accurately and effectively bond two elements together.

BACKGROUND OF THE INVENTION

Friction welding is a well-known process in which two components, moving relative to each other, are brought into contact under pressure and bonded at their interface. The motion at the weld interface may be rotational or non-rotational. Non-rotational motion includes linear, elliptical or vibratory motion. Friction welding by rotational motion typically requires at least one of the components be circular in cross section. However, friction welding by non-rotational motion has received attention as a means of bonding components, where the weld interface of both parts is non-circular.

In non-rotational friction welding, one component is oscillated relative to the other component while a forge force is applied normal to the direction of motion. The forge force moves the components into contact, and with metal components the friction between the components generates heat and plasticizes them. Once the motion stops, the metal solidifies, thus bonding the components. This relative simplicity of the process, as compared to other welding processes, lends itself to methodologies that permit tight control of the weld process. Rigid process control may eliminate the necessity of post-weld inspection of the components. Weld parameters such as frequency and amplitude of oscillation, axial displacement, and normal force can be precisely monitored and controlled to produce consistent and repeatable welds.

For plastic components, the friction weld process is typically performed at high frequencies and low forge forces. An example of a process for friction welding thermoplastic components is disclosed in U.S. Pat. No. 4,377,428, issued to Toth and entitled "Method of Friction Welding".

However, for metal components, the conditions required for friction welding are much more stringent. In addition, there are large forces associated with friction welding metal components. Typically, for metal components the oscillation frequencies are less than/about 100 Hz, depending on the part size and shape, and the forge forces are greater than 5000 lbs. force. A welder having substantial structure is needed to withstand the larger forces associated with friction welding of metal components. Due to the size of such structures, interference between the oscillation frequency and the resonant frequency of the welder is a concern. In addition, repeatability of the process is necessary for process control. Repeatability requires the final position of the components, when welded, to be accurate and predictable.

The actuation system used to generate the oscillating motion must be able to provide a consistent frequency and amplitude and be able to locate the oscillated component in the proper position for forging. One type of actuation system is a mechanically driven system such as that disclosed in U.S. Pat. No. 5,148,957, issued to Searle and entitled "Friction Welding". In this type of actuation system, cams and joints are used to provide the reciprocating motion. A drawback to mechanically driven actuation systems is the wear, which occurs in the system components. As the system is used, the cams, joints, and bearings will wear which will result in deviations that have to be accounted for, to ensure accuracy and repeatability of the process. Eventually the wear will require replacement of worn parts, which introduces an additional deviation to be accounted for. The actuation system will require re-calibration frequently to account for all the deviations. Another example of a mechanically driven actuation system is disclosed in U.S. Pat. No. 4,858,815, issued to Roberts et al and entitled "Friction Welder Mechanism".

Another type of actuation system is a servo-hydraulically controlled actuation system, such as that disclosed in U.S. Pat. No. 4,844,320, issued to Stokes et al and entitled "Control System and Method for Vibration Welding". One limitation to known types of servo-hydraulics is the interference between the oscillating frequency and the natural frequency of the hydraulic column. To generate low frequencies (<100 Hz) and the forge forces needed to move metal components subject to a normal force, the hydraulic columns needed are typically large enough to have natural frequencies of the same order of magnitude as the oscillating frequency.

A particularly useful application for which friction welding is useful is in fabricating integrally bladed rotors for gas turbine engines. An example of this type of application is disclosed in U.S. Pat. No. 5,035,411, issued to Daines et al and entitled "Friction Bonding Apparatus". An integrally bladed rotor is a rotor assembly wherein the rotor blades are bonded, typically by welding, directly to the rotor disk at spaced intervals about the circumference of the disk. Since there are numerous rotor blades bonded to each disk, the bonding process must be accurately repeatable. In this way individually manufactured components each with selected properties may be joined. Each bonded blade must be accurately positioned within tight tolerances required for aerospace applications. An improved friction welder and method are sought for friction welding large scale, complex shapes formed from various metallic materials.

DISCLOSURE OF THE INVENTION

The present invention is predicated in part upon the recognition that non-planar forces, relative to the plane of the forge pressure, cause deviations in the location of the parts being bonded. The deviation degrades the accurate repeatability of the welding process.

According to the present invention, a friction welder for joining a pair of elements includes a forge assembly having a table defining a platform for disposing one of the elements thereon and wherein, during the application of forge pressure between the elements, non-planar forces in the platform are minimized. Forge pressure is generated between the elements by a forge link disposed on one side of the platform and reacted by a reaction link disposed on the opposite side of the platform. The two links are equidistant from the plane of the platform and connected by a crank that is also pivotally connected to the table.

A principle feature of the present invention is the table having a reaction link disposed opposite of the forge link. The advantage produced thereby is the accuracy of the welded position between the two elements as a result of the minimized non-planar forces in the platform. Minimizing or eliminating non-planar forces in the platform results in minimizing or eliminating deflections and deviations in the relative positions of the elements being welded. Another advantage is the accurate repeatability of the process as a result of the control over deflections and deviations in relative position.

According to another embodiment of the present invention, a method of friction welding a pair of elements includes the step of balancing the moments in the table such that non-planar forces in the platform are minimized. In a specific embodiment, the method includes the steps of placing the forge link in a bent position such that the elements may be positioned in the welder and placing the forge link in the forge position such that forge force may be applied to the elements. The step of balancing the moments and deflections in the table prior to reciprocating the elements improves the accuracy and repeatability of the weld process.

According to a further embodiment, the forge link includes a first end, a second end, both of which are disposed on a forge axis, and a pivoting joint therebetween. The pivoting joint permits the forge link to be flexed such that the table may be moved away from the point of engagement between the two elements.

The feature of the forge link having the pivoting joint results in the advantage of ease of assembly of the elements into the friction welder. The pivoting joint permits the table to move away from the point of engagement to thereby provide access to the tooling and gripper.

According to a specific embodiment of the present invention, the friction welder includes a frame having a base, a pair of vertically extending trusses interconnected at one end and to the base at the opposite end, and a diagonal truss extending between the vertical trusses and the base. A reciprocal motion assembly is disposed on the diagonal truss. The forge link extends between the diagonal truss and the crank.

A further feature of the present invention is the capability to use a servo hydraulic control system used in the reciprocating motion assembly. The advantage is the improved control of the reciprocal motion assembly for reciprocating frequencies of less than 100 Hz. The stiffness of the frame and forge assembly and the minimal length of the hydraulic column within the servo hydraulic control of the reciprocating motion assembly results in a natural frequency for the structure servo hydraulic control in excess of the reciprocating frequencies required.

BEST MODE FOR CARRYING OUT THE INVENTION

Figure 1:
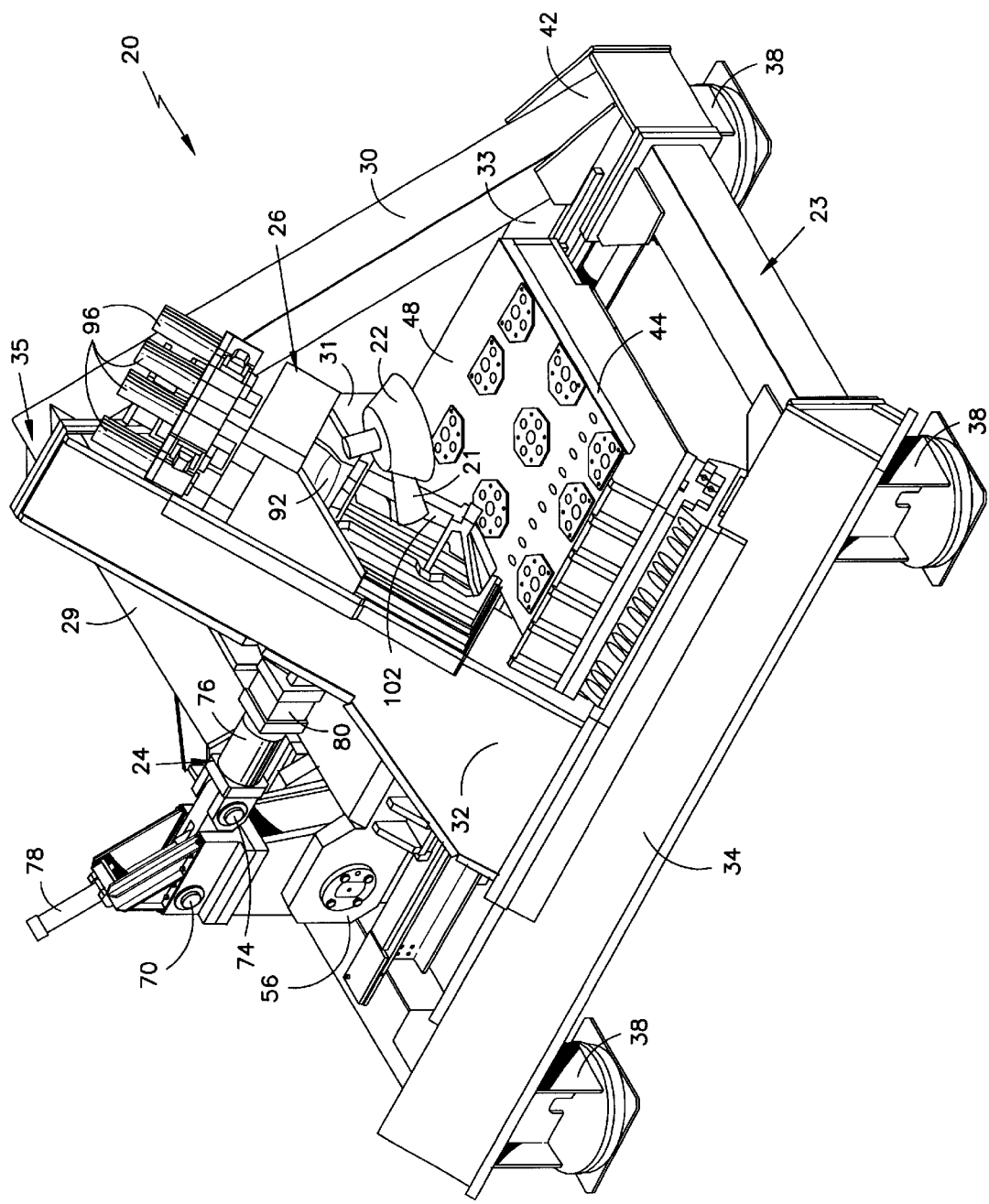
FIGS. 1 and 2 are perspective views of a friction welder with an indexing turret removed for clarity.

Referring to FIG. 1, the friction welder 20 is an apparatus for friction welding a first element 21 to a second element 22. An indexing turret (base tool) (not shown) which in operation would hold the second element 22 in the illustrated position has been removed for clarity. In the illustrated application, the first element 21 is a rotor blade, or airfoil and the second element 22 is a rotor disk. Once all the rotor blades are welded to the rotor disk an integrally bladed rotor is formed.

The friction welder 20 generally includes a frame 23, a forge assembly 24, and a reciprocal motion assembly 26. The frame 23 includes a plurality of struts and trusses. A rectangular base is formed from the horizontal struts, represented by the struts 33 and 34. The rectangular base together with vertical first, second, third and fourth trusses 29, 30, 31 and 32, respectively, form a pyramid-like configuration. The first and second trusses 29 and 30 connect to the opposite ends of the strut 33 and connect together at a common junction 35 to form a vertically extending triangle with the strut 33. The third truss 31 extends vertically from the common junction 35 to the center of the strut 33. The fourth truss 32 extends diagonally from the common junction 35 to the strut 34. The frame further includes four support legs 38 one at each corner of the base. The pyramid like frame 24 formed by the configuration of struts and trusses is a strong, rigid support structure to accommodate the forces associated with the reciprocal motion assembly 26 and the forge assembly 24 during the friction weld process.

Figure 2:
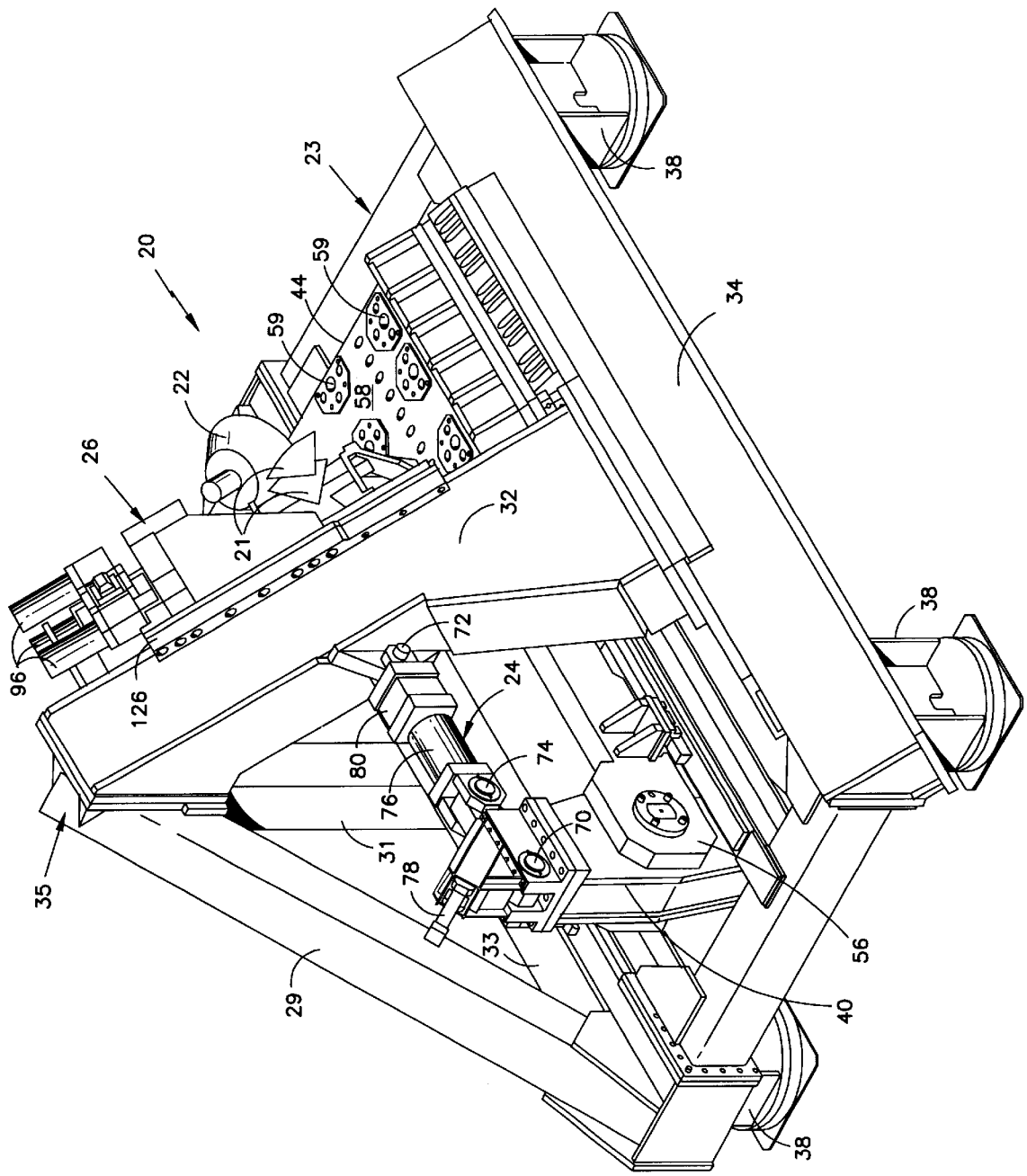
Figure 3:
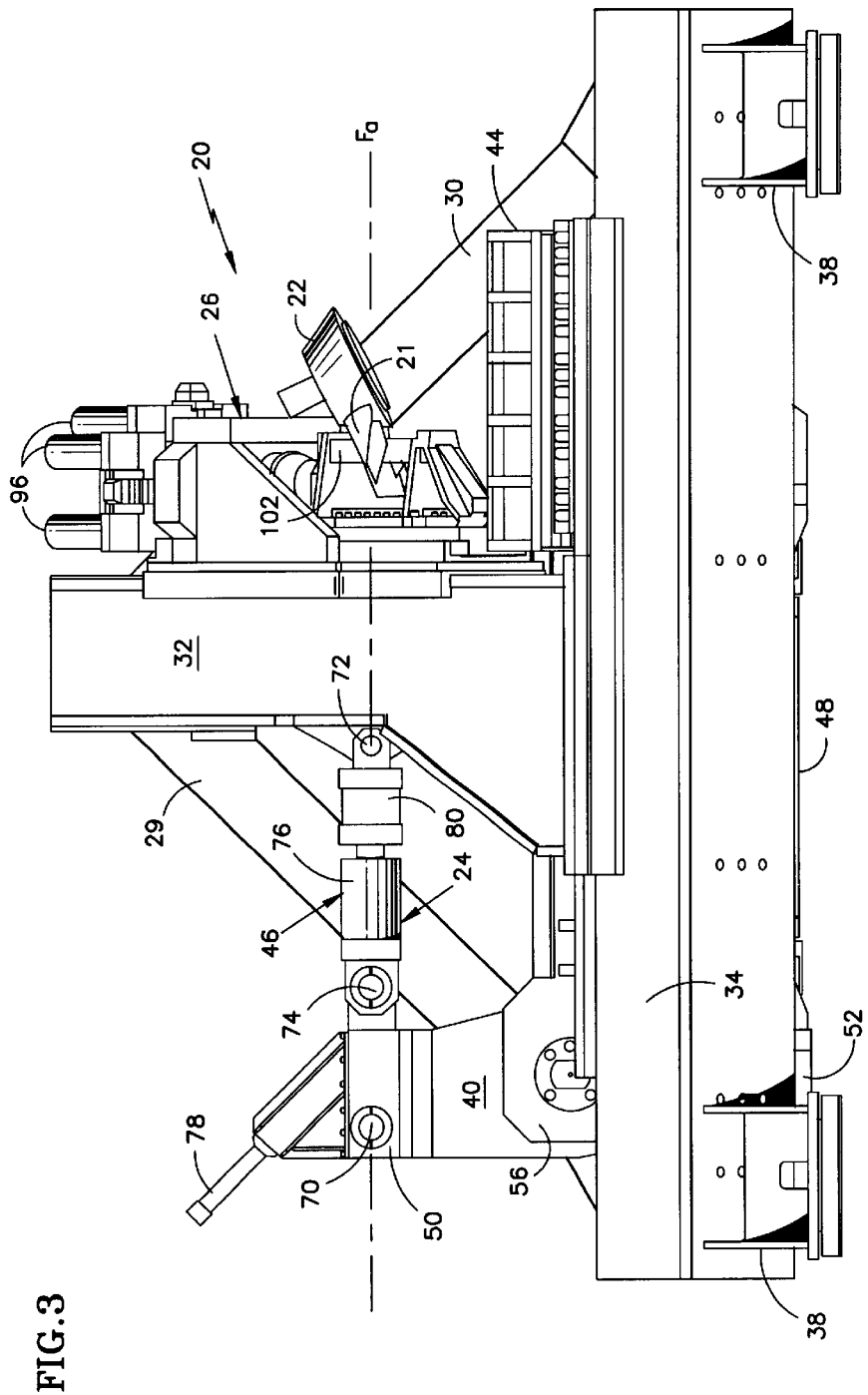
FIG. 3 is a left side view of the friction welder in FIG. 1, in a loaded operating mode with the indexing turret removed for clarity.
Figure 4:
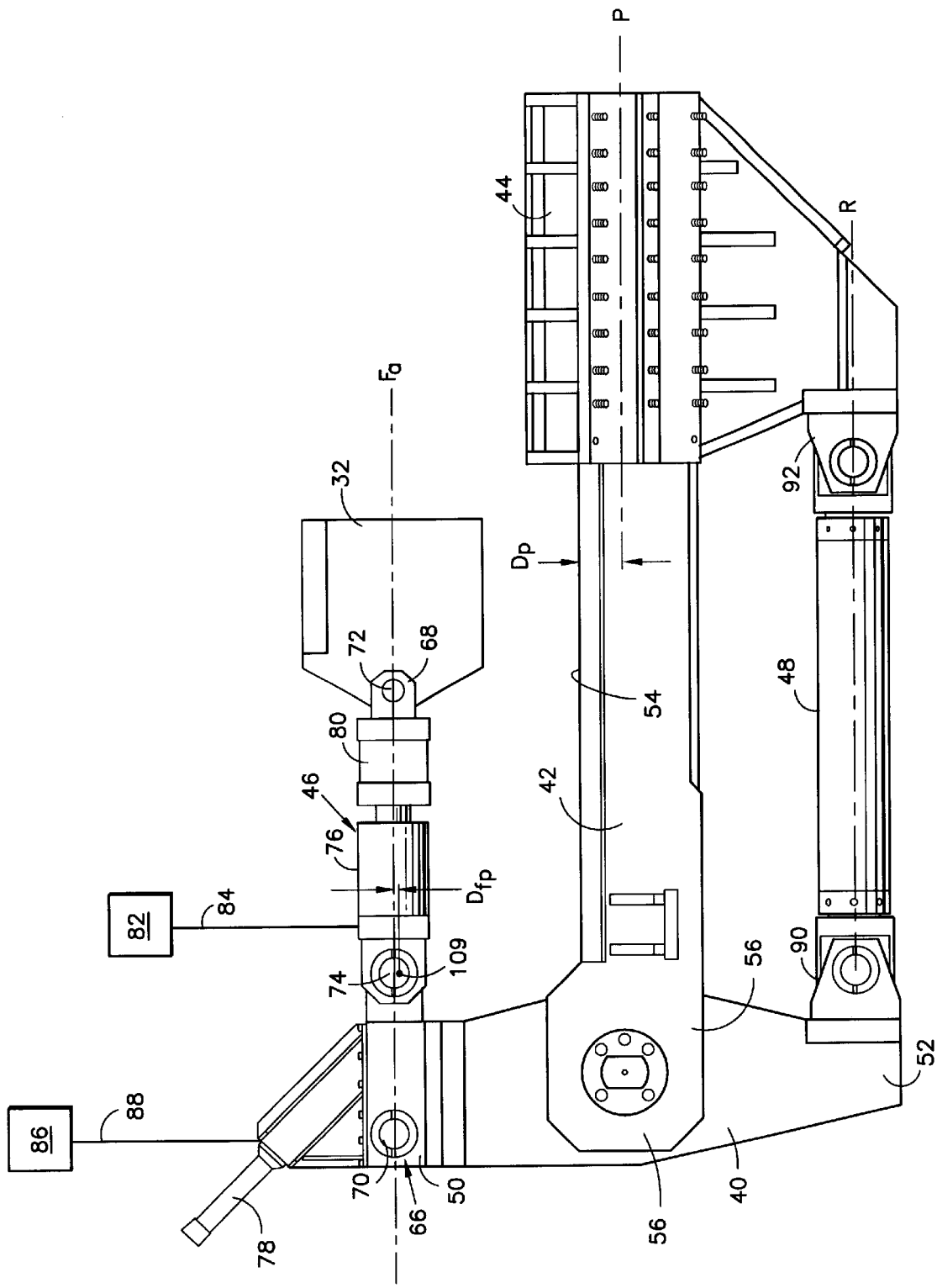
FIG. 4 is a front view of the friction welder

Referring to FIGS. 2 and 3, the forge assembly 24 is supported by the frame 23 and provides a forge force or load along a forge axis Fa. The forge assembly 24 includes a crank 40, a table link 42, a table 44, a forge link 46, and a reaction link 48 (as best shown in FIG. 4). Referring to FIG. 4, the crank 40 has an upper end 50 and a lower end 52. The table link 42, which supports the table 44, has an upper surface 54 and a first end 56. The first end 56 of the table link 42 is pivotally connected to the crank 40 between the upper and the lower ends 50 and 52 of the crank. A platform axis P is disposed a predetermined distance $D_p$ below the upper surface 54 of the table link 42.

Figure 5:
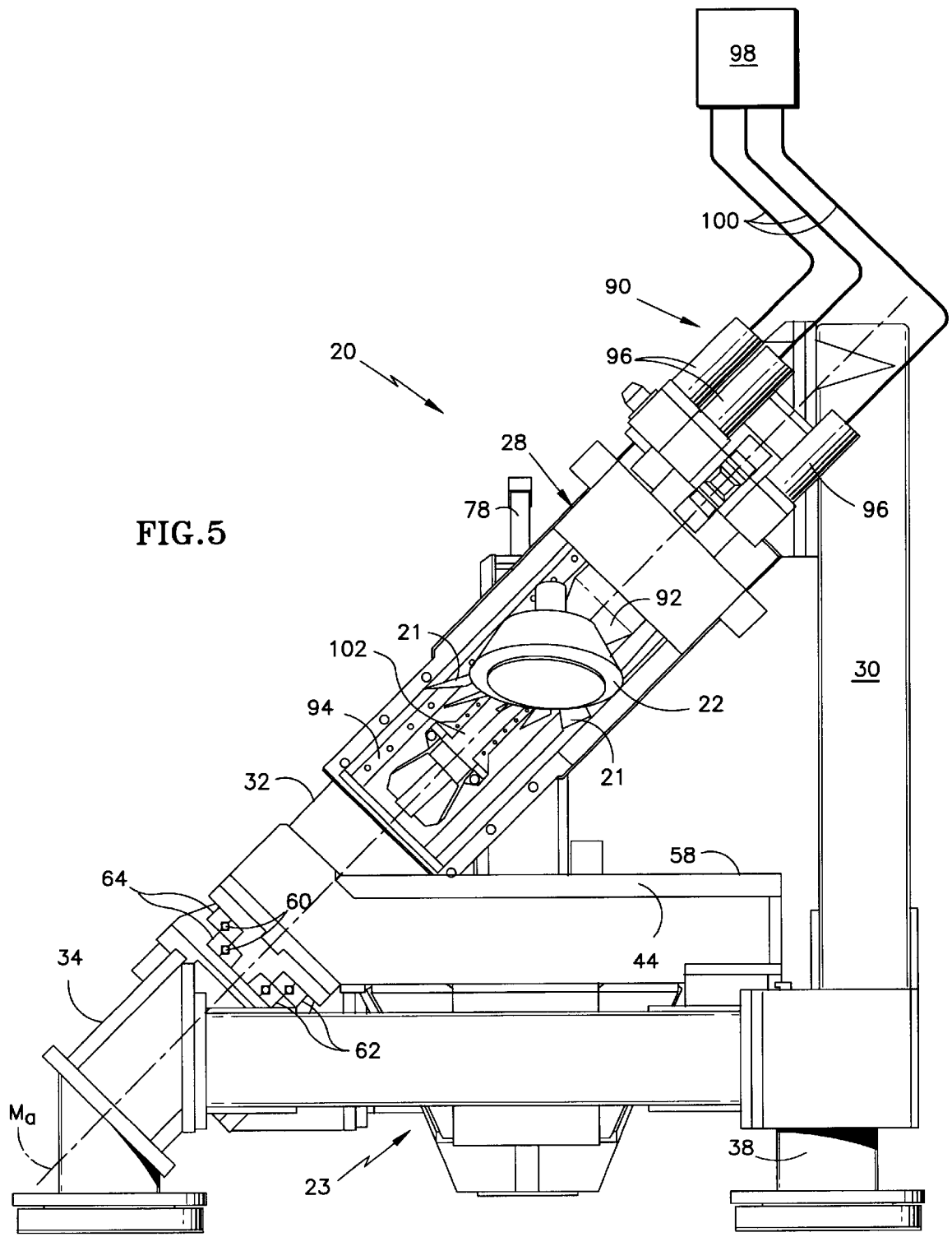
FIG. 5 is a left view of a forge assembly of the friction welder in a forge loaded position.

The table 44 has a platform 58 to support an indexing turret (not shown). The table 44 further includes a plurality of bores 59 extending therethrough (as shown in FIG. 1). The table is disposed on the table link 42 so that the table 44 is in a sliding relationship with the struts 33 and 34 (as shown in FIG. 1) of frame 23. Referring to FIG. 5, the sliding relationship is accommodated by a plurality of roller bearings 60. The roller bearings 60 are engaged with first bearing surfaces 62, which are aligned with a motion axis $M_a$, and second bearing surfaces 64, which are perpendicular to the motion axis $M_a$. The motion axis $M_a$ extends along the length of the diagonal truss 31. The engagement between the roller bearings 60 and the first and second bearing surfaces 62 and 64 is adapted to provide support for the mass of the second element 22 during sliding of the table 44, and to withstand the forces generated by the reciprocal motion assembly 26.

Referring again to FIG. 4, the forge link 46 is characterized by a first end 66 and an opposed second end 68. The forge link 46 further includes a first and second linking pivot 70 and 72, a folding pivot 74, a primary hydraulic actuator 76, a secondary hydraulic actuator 78, and a load cell 80. The first end 66 of the forge link 46 is pivotally engaged with the upper end 50 of the crank 40 via the first linking pivot 70. The second end 68 of the forge link 46 is pivotally engaged with the fourth truss 31 via the second linking pivot 72. The folding pivot 74 is disposed between the first and second linking pivots 70 and 72. The forge axis $F_a$ is defined to extend through the first and second ends 66 and 68 of the forge link, parallel to the platform axis P. Both the first and second linking pivots 70 and 72 are centered on the forge axis $F_a$. The folding pivot 74 is positioned so that the center is offset a nominal distance $D_{Fa}$ from the forge axis $F_a$.

The primary hydraulic actuator 76 extends between and is connected to the folding pivot 74 and the load cell 80. The forge force is generated by the primary hydraulic actuator 76. The primary hydraulic actuator 76 is connected in a conventional manner to a primary supply of hydraulic fluid 82 via primary conduit 84 to flow the fluid. Forces generated in the forge link 46 by the primary hydraulic actuator 76 are sensed by the load cell 80.

The secondary hydraulic actuator 78 is adjacent to the first linking pivot 70, and generates the movement of the forge link 46 between the loaded and unloaded positions. The secondary hydraulic actuator 78 is connected in a conventional manner to a secondary supply of hydraulic fluid 86 via a secondary conduit 88 to flow the fluid 86.

The reaction link 48 has a first end 90 and an opposed second end 92. The first end 90 is pivotally engaged with the lower end 52 of the crank 40. The second end 92 is pivotally engaged with the table 44. A reaction axis R extends through the first and second ends 90 and 92 of the reaction link 48. The reaction axis R is parallel to both the forge axis $F_a$ and the platform axis P. Further, reaction axis R and the forge axis $F_a$ are equidistant from the platform axis P. As a result of this geometry, moments generated in the upper end 50 of the crank 40 by the forge link 46 are opposed by the moments generated in the lower end 52 of the crank 40 by the reaction link 48; thus bending moments in the platform 58, and in the second element 22 (shown FIG. 3) when the second element 22 is mounted on the table 60 are minimized or eliminated.

Now referring to FIGS. 1 and 5, the reciprocal motion assembly 26 is adapted to generate reciprocating motion between the first and second elements 21 and 22, respectively. The reciprocal motion assembly 26 includes a hydraulic actuator assembly 90, a load cell 92, and a slide 94. The hydraulic actuator assembly 90 is comprised of a plurality of hydraulic columns, represented by the hydraulic column 96. Each column 96 is connected in a conventional manner to a supply of hydraulic fluid 98 via a conduit 100 to flow the fluid. The reciprocal motion assembly should be a servo-hydraulic motion actuator with a hydraulic column natural frequency greater than the frequency of reciprocation. The slide 94 is slidingly engaged with the diagonal truss 32 of the frame 24 by a bearing assembly 126 (as shown in FIG. 2). Through the hydraulic actuator assembly 90 the slide 94 is made to move along the motion axis $M_a$ in a linear reciprocating motion. The motion axis $M_a$ is perpendicular to the forge axis $F_a$ The hydraulic actuator assembly is connected to the load cell 92. A gripper 102 (FIG. 3) is attached to the slide 94, and holds the first element 21, so that when the slide 94 is moved the first element 21 also moves relative to the second element 22.

Figure 6:
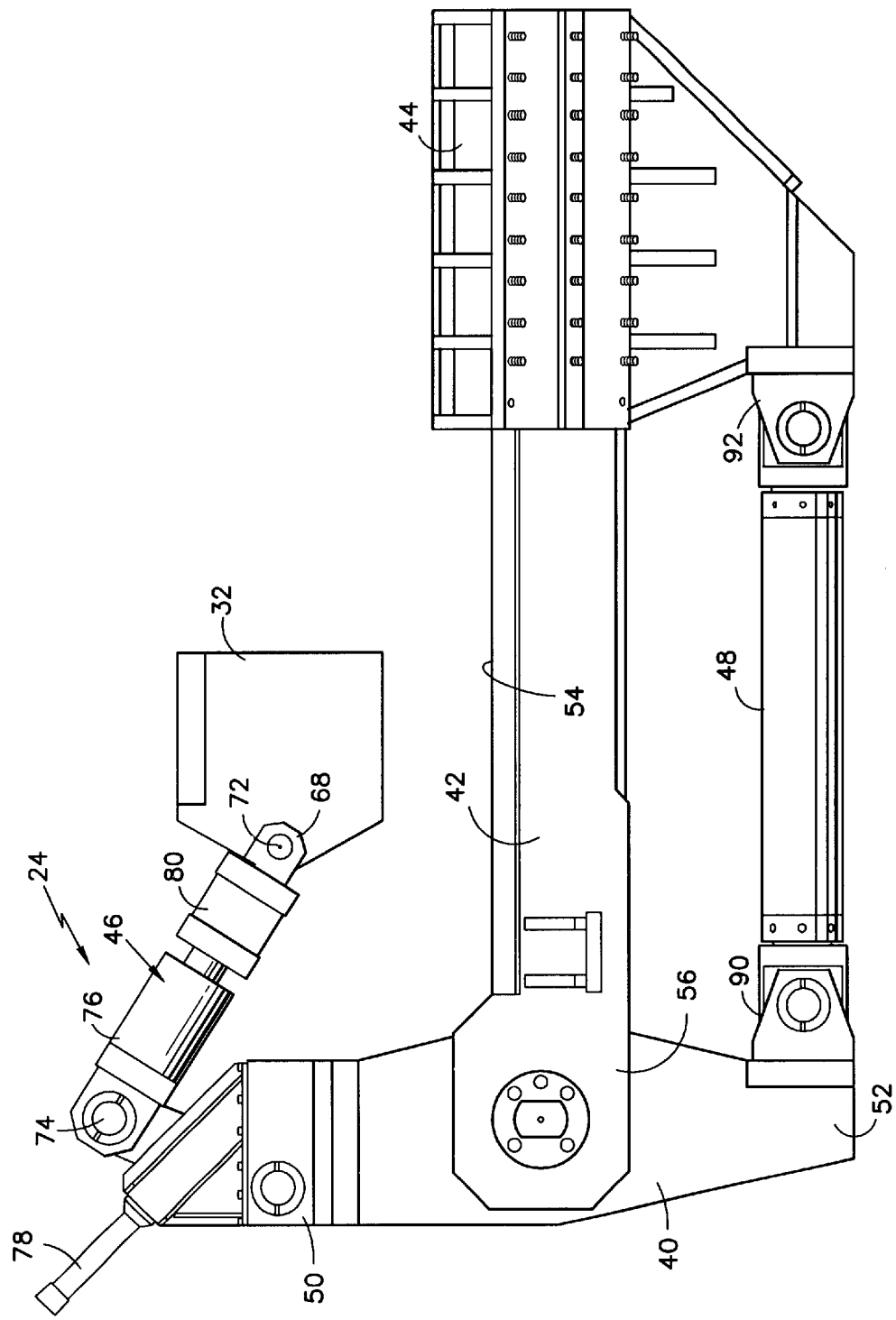
FIG. 6 is a left side view of the forge assembly of the friction welder in a forge unloaded position.

Set up of the friction welder will now be discussed. Referring to FIG. 6, the friction welder 20 in an unloaded position, where the table 44 is spaced from the diagonal truss 31. The forge link 46 is placed into the unloaded position by actuating the second hydraulic actuator 76 (as shown in FIG. 4). Thus, as the forge link 46 pivots at the folding pivot 70 the upper end 50 of the crank moves toward the diagonal truss 34, and consequently the lower end 52 of the crank moves toward the diagonal truss 34. Due to the reaction link 48 the table 44 moves away from the diagonal truss 34 along the upper surface 54 of the table link. This allows access to the table 44 so that the indexing turret (not shown) can be attached. In the unloaded position, the indexing turret 50 is secured to the table 28 and the second element 22 is secured to the indexing turret 50 in the proper weld position, as described in copending U.S. patent application Ser. No. 09/187,073 entitled "Indexing Turret." In this position, the first element 21 should be loaded into the gripper 36 as described in copending U.S. patent application Ser. No. 09/187,511 entitled "Gripper." Now the second element 22 must be aligned with the first element 21, so that their respective bonding surfaces (not shown) are aligned along the forge axis $F_a$.

Now referring to FIG. 1, the friction welding process may start with the application of an initial forge load by the forge assembly 24, and then activation of the reciprocal motion assembly 28, or the reciprocal motion may be initiated prior to application of any forge load. Either way, desired forge load and oscillating frequencies may be applied via the forge assembly 24 and the reciprocating motion assembly 26.

Referring to FIG. 6, the forge load is applied by bringing the forge link 46 into the forge load position by actuating the first hydraulic actuator 76 (FIG. 4). Activation of the first hydraulic actuator 76 urges the upper end 50 of the crank 40 to move away from the diagonal truss 31. As a result, the lower end 52 moves in the opposite direction, and through the reaction link 48 the table 44 is urged toward the third truss 34. Movement of the table 44 in turn causes the mounted index turret 50 (not shown) and second element 22 to be urged towards the diagonal truss 34. This further results in the bonding surface of the second element 22 being brought into contact with the bonding surface of the first element. As the forge assembly 46 continues to move the table 44 closer to the diagonal truss 32 the forge load is directed along the forge axis $F_a$. The load cell 80 measures the forge load.

The forge link 46 has a forge load position, as shown in FIG. 4, and an unload position, as shown in FIG. 6. As shown in FIG. 5, the forge link is in the forge load position because the forge link 46 is extended along the forge axis $F_a$. The forge loads are produced when the forge link is in the forge load position. To prevent the forge link 46 from buckling from the forge load position into the unload position during application of forge loads, the folding pivot 74 is centered on a location, which is offset a nominal distance $D_{fp}$ from the forge axis $F_a$. This location 109 is offset in the direction opposite of the location where the folding pivot 74 would be in the unloaded position (see FIG. 6). Referring to FIG. 6, in the unload position, the forge link 46 is pivoted so that the forge link no longer lies along the forge axis. This bending is facilitated by the linking pivots 70 and 72 and the folding pivot 74.

Referring to FIGS. 3 and 5, oscillation of the first element 21 is achieved by activation of the hydraulic columns 96 of the hydraulic actuator assembly 90. This causes the slide 94, gripper 102, and the first element 21 to reciprocate along the motion axis $M_a$. The load cell 92 measures and only measures to the friction force of the contact between the first and second elements 21 and 22.

The application of the forge load and reciprocating load causes the bonding surfaces of the elements to heat up due to friction which plasticizes the metal components then the forge load joins them. Upon completion of the friction weld, while the friction welder is in the loaded position, the first element 21 is freed from the gripper 102, so that when the forge assembly 26 is actuated, the table 44 moves and the second element 22 moves away from the diagonal truss 31, pulling the first element 21 now bonded to the second element 22, out of the gripper 102. In order to weld subsequent first elements 21 to the second element 22, the second element 22 must be rotationally released, rotated and rotationally constrained as discussed above. The friction bonding process may be repeated for each bonding position on the second element as discussed above until completion of the integrally bladed rotor.

Although the invention has been shown and described with respect with exemplary embodiments thereof, it should be understood by those skilled in the art that various changes, omissions, and additions may be made thereto, without departing from the spirit and scope of the invention.

What is claimed is:

1. An apparatus for friction welding of a first element to a second element, the apparatus having a planar axis defined by the direction of relative motion between the two elements during operation and a forge axis defined by the direction of forge load during operation, the apparatus including:
   a frame including a base;
   a reciprocal motion assembly adapted to generate reciprocating motion between the first element and the second element along the planar axis, the reciprocal motion assembly disposed on the frame; and
   a forge assembly including:
      a table disposed in a sliding relationship to the base, the table including a platform defining a plane parallel with the forge axis and a base tool for the second element positioned on one end of the table, the base tool adapted to position the second element for engagement with the first element upon sufficient sliding motion of the table, wherein such engagement defines a point of engagement that lies on the forge axis;
      a crank pivotally engaged with the end of the table opposite the base tool, the crank having an upper end and an opposing lower end with the table pivotally engaged therebetween;
      a forge link having a first end pivotally engaged with the upper end of the crank and a second end pivotally engaged with the frame, the forge link including means to produce a forge load along the forge axis, the first end and second end being on the forge axis;
      a reaction link disposed on the opposite side of the platform relative to the forge link, the reaction link including the first end pivotally engaged with the lower end of the crank and the second end pivotally engaged with the table, the first and second ends of the reaction link being equal distance from the plane of the platform as the first and second ends of the forge link.

2. The apparatus according to claim 1, wherein the forge link includes a pivoting joint disposed between the first end and the second end, the pivoting joint permitting the forge link to bend such that the base tool may slide away from the point of engagement to provide access to the second element and the base tool.

3. The apparatus according to claim 2, wherein the pivoting joint has a bent position permitting access to the base tool and a forge load position permitting application of the forge load, and wherein in the forge load position the pivoting joint is offset from the forge axis in a direction opposite the location of the pivoting joint in the bent position.

4. The apparatus according to claim 1, wherein the reciprocating means includes a servo hydraulic motion actuator engaged with the first element and adapted to provide reciprocal motion along the planar axis, the motion actuator having a hydraulic column natural frequency substantially different from the frequency of reciprocation.

5. The apparatus according to claim 1, wherein the forge load means includes a servo hydraulic forge actuator adapted to extend the forge link, the forge actuator having a hydraulic column natural frequency substantially different from the frequency of reciprocation.

6. The apparatus according to claim 1, wherein the frame includes a pair of vertically extending trusses interconnected at one end of each of the pair of trusses and connected to the base at the opposing ends, and a diagonal truss having one end connected to the pair of trusses and the opposite end connected to the base, wherein the reciprocal motion means is disposed on the diagonal truss, and wherein the second end of the forge link is pivotally engaged with the diagonal truss.

7. The apparatus according to claim 1, wherein the first element is a rotor blade, the second element is a rotor disk, wherein the base tool retains the rotor disk, and wherein the reciprocal motion assembly includes a gripper for retaining the rotor blade.

* * * * *